United States Patent [19]

Breault et al.

[11] Patent Number: 4,908,770
[45] Date of Patent: Mar. 13, 1990

[54] MAIL MANAGEMENT SYSTEM ACCOUNT VALIDATION AND FALLBACK OPERATION

[75] Inventors: Michelle S. Breault, Fairfield; John H. Steinmetz, Bridgeport, both of Conn.

[73] Assignee: Pitney Bowes, Inc., Stamford, Conn.

[21] Appl. No.: 68,696

[22] Filed: Jun. 30, 1987

[51] Int. Cl.[4] .............................................. G07B 17/02
[52] U.S. Cl. .............................. 364/464.02; 235/382.5; 364/900
[58] Field of Search ........................... 235/382, 382.5; 364/464, 466, 464.02, 464.03, 466, 900 MS File; 380/23, 25

[56] References Cited

U.S. PATENT DOCUMENTS

| | | | |
|---|---|---|---|
| 4,097,923 | 6/1978 | Eckert, Jr. et al. | 364/900 |
| 4,447,890 | 5/1984 | Duwel et al. | 364/900 |
| 4,511,793 | 4/1985 | Racanelli | 364/466 X |
| 4,549,281 | 10/1985 | Eckert et al. | 364/900 |
| 4,629,871 | 12/1986 | Scribner et al. | 235/382.5 X |
| 4,752,950 | 6/1988 | Le Carpentier | 364/464.02 X |
| 4,787,045 | 11/1988 | Storace et al. | 364/464.02 |
| 4,812,992 | 3/1989 | Storace et al. | 364/464.02 |

Primary Examiner—Parshotam S. Lall
Assistant Examiner—Edward R. Cosimano
Attorney, Agent, or Firm—Donald P. Walker; Melvin J. Scolnick; David E. Pitchenik

[57] ABSTRACT

A mail management system (MMS) comprises a host system coupled to one or more operator workstations. The host is operable for receiving from each of the workstations account identification codes. The host, after verifying the validity of the account code, transmits an enabling signal to the workstation which permits the workstation to activate an attached postage dispensing device. The MMS also provides a fallback mode of operation wherein each workstation is operable for verifying that the format of an entered account identification code is correct and to thereby activate the postage dispensing device. This fallback mode of operation allows for the continued operation of the MMS even if the host system is for any reason disabled from communicating with a workstation.

14 Claims, 15 Drawing Sheets

FIG. 6.

| ADD TO AN ACCOUNT | |
|---|---|
| ACCOUNT # | : 1234ABC |
| CLASS | : 1 |
| OPERATOR ID | : 2 |
| MACHINE ID | : 20 |
| JOB NUMBER | : 4445 |
| JOB TYPE | : 3 |
| DATE | : 03-10-87 |
| START TIME | : 00:00:00 |
| END TIME | : 00:00:00 |
| PIECES | : 2 |
| ACT. POST. | : 5.00 |
| CHG. POST. | : 5.24 |

↑ (E)

| SUBTRACT FROM AN ACCOUNT | |
|---|---|
| ACCOUNT # | : 1234ABC |
| CLASS | : 1 |
| OPERATOR ID | : 2 |
| MACHINE ID | : 20 |
| JOB NUMBER | : 4445 |
| JOB TYPE | : 3 |
| DATE | : 03-10-87 |
| START TIME | : 00:00:00 |
| END TIME | : 00:00:00 |
| PIECES | : 3 |
| ACT. POST. | : 4.45 |
| CHG. POST. | : 5.00 |

↑ (F)

| TRANSFER BETWEEN ACCTS. | | |
|---|---|---|
| | FROM | TO |
| ACCOUNT # | : 1234567 | : SPY-007 |
| CLASS | : 2 | 2 |
| OPERATOR ID | : 2 | 2 |
| MACHINE ID | : 30 | 30 |
| JOB NUMBER | : 4445 | 4445 |
| JOB TYPE | : 4 | 4 |
| DATE | : 03-10-87 | 03-10-87 |
| START TIME | : 00:00:00 | |
| END TIME | : 00:00:00 | |
| PIECES | : 2 | |
| ACT. POST. | : 5.00 | |
| CHG. POST. | : 5.24 | |

↑ (G)

| ENTER MANUAL TRANSACTION | |
|---|---|
| ACCOUNT # | : |
| CLASS | : |
| OPERATOR ID | : |
| MACHINE ID | : |
| JOB NUMBER | : |
| JOB TYPE | : |
| DATE | : |
| START TIME | : |
| END TIME | : |
| PIECES | : |
| ACTUAL POSTAGE | : |
| CHARGED POSTAGE | : |

...ACCOUNT SET UP REPORT...

| ITEM | ACCOUNT | ACCOUNT NAME | LOCKED | %SURCHG | EDITED | CHARGE BY | BUDGET ENTERED |
|---|---|---|---|---|---|---|---|
| 1. | 1234ABC | PERSONNEL | NO | 1.20 | | CLASS | YES |
| 2. | 5678DEF | PAYROLL | NO | 1.20 | | CLASS | YES |
| 3. | 222XXX | RESEARCH | NO | 1.20 | | CLASS | YES |

ACCOUNT SUMMARY
3 ACCOUNTS ASSIGNED
  0 LOCKED
  3 UNLOCKED

3 ACCOUNTS WITH BUDGETS ENTERED

0 ACCOUNTS CHARGING BY ACCOUNT
  3 ACCOUNTS CHARGING BY CLASS

...END OF ACCOUNT SET UP REPORT...

FIG. 14

ADD ACCOUNT

ACCOUNT NUMBER : 1234567    ACCOUNT LOCKED? : N
ACCOUNT NAME    : PERSONEL    CLASS ENABLED? : N

YEARLY BUDGET   68,000.00

(D6)

| BUDGET PERIOD | AMOUNT | BUDGET PERIOD | AMOUNT |
|---|---|---|---|
| JAN : | 0.00 | JUL : | 0.00 |
| FEB : | 0.00 | AUG : | 0.00 |
| MAR : | 0.00 | SEP : | 0.00 |
| APR : | 0.00 | OCT : | 0.00 |
| MAY : | 0.00 | NOV : | 0.00 |
| JUN : | 0.00 | DEC : | 0.00 |

DISPLAY / MODIFY ACCOUNT

ACCOUNT NUMBER : 1234567    ACCOUNT LOCKED? : N
ACCOUNT NAME    : PERSONEL    CLASS ENABLED? : N

YEARLY BUDGET   68,000.00

(D7)

| BUDGET PERIOD | AMOUNT | BUDGET PERIOD | AMOUNT |
|---|---|---|---|
| JAN : | 0.00 | JUL : | 0.00 |
| FEB : | 0.00 | AUG : | 0.00 |
| MAR : | 0.00 | SEP : | 0.00 |
| APR : | 0.00 | OCT : | 0.00 |
| MAY : | 0.00 | NOV : | 0.00 |
| JUN : | 0.00 | DEC : | 0.00 |

DELETE ACCOUNT

ACCOUNT NUMBER : 1234567    ACCOUNT LOCKED? : N
ACCOUNT NAME    : PERSONEL    CLASS ENABLED? : N

YEARLY BUDGET   68,000.00

(D8)

| BUDGET PERIOD | AMOUNT | BUDGET PERIOD | AMOUNT |
|---|---|---|---|
| JAN : | 0.00 | JUL : | 0.00 |
| FEB : | 0.00 | AUG : | 0.00 |
| MAR : | 0.00 | SEP : | 0.00 |
| APR : | 0.00 | OCT : | 0.00 |
| MAY : | 0.00 | NOV : | 0.00 |
| JUN : | 0.00 | DEC : | 0.00 |

FIG. 16

```
... OPERATOR ID SET UP REPORT ...

ITEM #   ID    NAME       PASSWORD    ACCESS LEVEL    STATUS
------   --    ----       --------    ------------    ------
  1       1    RICHARD      007       MDS OPERATOR    ACTIVE
  2       2    HELEN       1234       OPERATOR        ACTIVE
  3       7    JOHN        8765       MANAGER         ACTIVE

OPERATOR SUMMARY
   3 OPERATORS ASSIGNED
   3 ACTIVE
   0 INACTIVE

PASSWORD SUMMARY
   1 MANAGER CODE ASSIGNED
   1 OPERATOR CODE ASSIGNED
   1 MDS OPERATOR CODE ASSIGNED

... END OF OPERATOR REPORT ...
```

(D9)

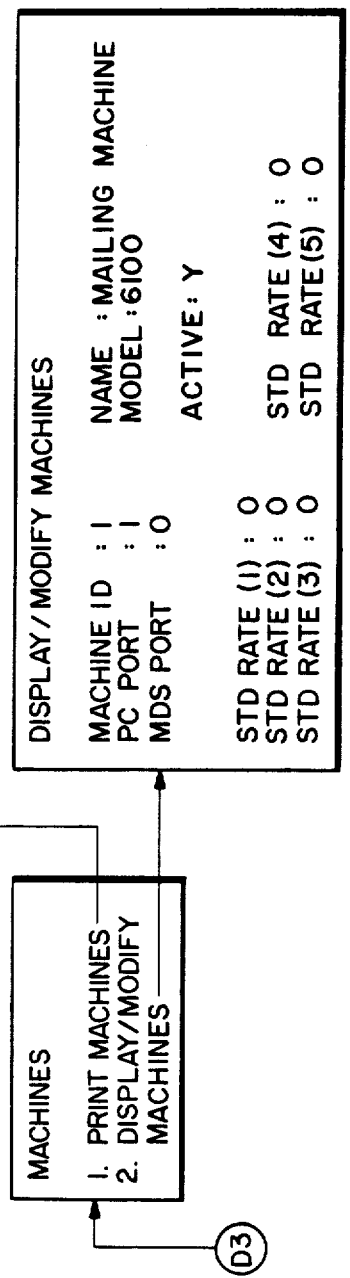

FIG. 20

D11 — MONTHLY SET UP

| PERIOD | NAME | START | END | FROZEN |
|--------|------|----------|----------|----------|
| 1ST    | JAN  | MM-DD-YY | MM-DD-YY | MM-DD-YY |
| 2ND    | FEB  | MM-DD-YY | MM-DD-YY | MM-DD-YY |
| 3RD    | MAR  | MM-DD-YY | MM-DD-YY | MM-DD-YY |
| 4TH    | APR  | MM-DD-YY | MM-DD-YY | MM-DD-YY |
| 5TH    | MAY  | MM-DD-YY | MM-DD-YY | MM-DD-YY |
| 6TH    | JUN  | MM-DD-YY | MM-DD-YY | MM-DD-YY |
| 7TH    | JUL  | MM-DD-YY | MM-DD-YY | MM-DD-YY |
| 8TH    | AUG  | MM-DD-YY | MM-DD-YY | MM-DD-YY |
| 9TH    | SEP  | MM-DD-YY | MM-DD-YY | MM-DD-YY |
| 10TH   | OCT  | MM-DD-YY | MM-DD-YY | MM-DD-YY |
| 11TH   | NOV  | MM-DD-YY | MM-DD-YY | MM-DD-YY |
| 12TH   | DEC  | MM-DD-YY | MM-DD-YY | MM-DD-YY |
| 13TH   |      | MM-DD-YY | MM-DD-YY | MM-DD-YY |

D12 — DISPLAY / MODIFY SITE SET UP

ACCOUNT NUMBER LENGTH : 7     MULTIPLY ACTUAL
              TYPE : A        POSTAGE BY : 1.000

BUDGET ENABLED ? : Y     JOB NUMBERS ENABLED ? : Y

DEFAULT TO CLASS ENABLED                       : Y
MULTIPLE QUOTAS PER MACHINE ENABLED            : N
MDS PASSWORD - MANAGEMENT STATION DOWN         : 1234

D13 — CLEAR DATA FILES

| DESCRIPTION | SELECT | VERIFY |
|---|---|---|
| CLEAR ACCOUNT LIST AND DATA | : | |
| CLEAR OPERATOR LIST AND DATA | : | |
| CLEAR MACHINE LIST AND DATA | : | |
| CLEAR CLASS FEE AND LIST | : | |
| CLEAR ACCOUNT/CLASS DATA | : | |
| CLEAR OPERATOR/MACH DATA | : | |
| CLEAR SET UP DEFAULTS | : | |
| CLEAR TRANSACTION DATA | : | |

MAIL MANAGEMENT SYSTEM ACCOUNT VALIDATION AND FALLBACK OPERATION

FIELD OF THE INVENTION

This invention generally relates to mailing systems and, in particular, relates to a mail management system having a host system and one or more operator workstations communicatively coupled thereto, the invention providing for the dispensing of postage under the control of the workstation subsequent to a time when the host system verifies the validity of an account code and, also, by a workstation if the host system is unable to communicate with the workstation.

BACKGROUND OF THE INVENTION

One particular concern in all systems that dispense postage, such as a postage meter, is that an accurate accounting be made of all postage dispensed. This accounting is required by law and, typically, is accomplished by well known accounting registers within the postage dispensing system. These registers may have the form of ascending and descending registers. Typically, the ascending register is incremented by a value representative of the total value of the postage dispensed while the descending register is simultaneously decremented by the value of postage dispensed. At any given time in the operation of the system, the values of the ascending and descending registers must reflect the total amount of postage provided. In order to provide an initial amount of postage funds to the system, the descending register is charged with a value amount which represents the amount of postage funds which will be dispensed, while the ascending register is reset to a zero funds condition. Typically, if for any reason a component of the postage dispensing system becomes inoperative, the further dispensing of postage is prohibited until the entire system is once more operable.

The evolution of mailing systems has resulted in the need for a mail management system which provides for the centralized control over one or more postage dispensing devices in such a way that the activity of the devices may be monitored and recorded by a host system. In this way, an accounting may be made of the activity of all of the postage dispensing devices which are coupled to the host. This centralized control leads to increased efficiencies and accounting reliability in the overall operation of a mailroom. As an example, in a large organization such as a corporation the mailroom will typically perform mailing services for a variety of different clients, such as departments, within the organization. Individual clients may be the marketing department, the product department, the legal department and other diverse interorganization departments. In order that each department may be accurately charged for the services performed by the mailroom it is desirable to generate a report which allocates, on a department by department basis, the postage expenditure and the value of services performed by the mailroom which are related to mailing functions.

In other organizations the mailroom may be a primary service provided by the organization, the organization typically processing and mailing material for a number of different clients. In this type of organization, it is essential that the postage dispensed and the services related to the dispensing of this postage be allocated on a client-by-client basis in order that each client may be correctly invoiced for the postage expended and the services rendered. Thus, it can be realized that in any type of organization having a mailroom that it is important that the mailroom be capable of uniquely identifying each client so that each client may be correctly invoiced.

As can be appreciated, in a large mailroom many thousands of pieces of mail may be processed during the course of a given day. Some of this mail may be required to be mailed on or before a given date in order to have value to the client or to the addressee. If for any reason the mailroom were to become inoperative for a period of time the mailing of these pieces of mail may be delayed such that the mail may lose its timed value. This is understandably an undesirable situation.

As has been previously discussed, it is also essential that the postage value of each piece of mail processed by accurately accounted for to prevent the fraudulent or the inadvertent dispensing of postage. In order to prevent the fraudulent or inadvertent dispensing of postage the mailroom may require that an operator enter a client account code or number which is transmitted from, for example, an operator workstation to a host system for validation. After validating the account code, the host may thereafter transmit a postage dispensing enabling signal to the workstation to dispense the required amount of postage. As can be appreciated, if the host system were inoperative the account validation may not occur, resulting in the inability of the workstation to enable an attached postage dispensing device to dispense postage.

SUMMARY OF THE INVENTION

The foregoing problems are overcome and other advantages are realized by a mail management system (MMS) which, in accordance with the method and apparatus of the invention, receives and validates client account identification codes and which also allows for the dispensing of postage even when the host system is inoperative.

In accordance with one embodiment of the invention, a MMS is comprised of a host system communicatively coupled to one or more operator workstations. Each workstation may further be coupled to a postage dispensing device, such as a postage meter. Preferably prior to the operation of the MMS for the dispensing of postage, the host transmits the format of a valid account identification code, or account code, to each workstation. The actual value of the account code may be maintained within the host system. Alternatively, the format may be stored within the workstation upon the installation of the workstation by an installer entering data indicative of a valid account code. During normal operation of the system, the workstation accepts an account code and a requested amount of postage entered by a workstation operator in order to initiate the dispensing of postage. The workstation verifies that the format of the account code agrees with the format previously entered. If the format of the account code entered by the operator does not match that previously stored within the workstation, the workstation is operable for indicating an error condition to the operator, thereby allowing the operator to reenter the account code. If the format of the entered account code agrees with the format stored within the workstation, the workstation is operable for transmitting this entered account code to the host where the validation of the account code is accomplished. The validation may include verifying that the account code is a valid number assigned to an active account. The validation may also involve the verification that the account has sufficient funds on deposit to dispense the requested amount of postage. If the account code is verified by the host, the host is operable to transmit to the workstation a postage dispensing enabling signal. The reception of this signal by the workstation enables the workstation to activate the attached postage meter to dispense the postage. If the account code is not validated by the host the postage enabling signal is not transmitted to the workstation which disables the workstation from dispensing the requested amount of postage.

In accordance with the invention, if for any reason the host system is inoperable or unable to communicate with the workstation, the workstation is enabled to dispense the requested postage after first verifying that the format of the account code matches the format of a predetermined valid account code previously stored within. This mode of operation is known herein as a fallback mode of operation. A record is maintained by the workstation for each such transaction, the record including at least the account code and the amount of postage dispensed for that account code while in the fallback mode. At a time subsequent to the dispensing of this postage and when the host system is once more operable to communicate with the workstation, the host may command the workstation to transmit this record or records of transactions which occurred while in the fallback mode of operation. After receiving these records the host system may attempt to validate the account codes or the host may store the records to be processed at a later time. If for any reason an account code is found not to be valid, the host system is operable to notify a MMS supervisor of such condition, thereby allowing the supervisor to determine the nature of the exception and to allocate, if possible, the expended postage to a valid account. Such notification may take the form of an error or exception file which is generated by the host. If the account code or numbers are determined to be valid, the host system will increment the postage funds spent by those accounts during the time that the fallback mode of operation was in effect.

In order for the workstation to dispense postage without first receiving the postage dispensing enabling signal from the host system, the MMS supervisor may enter a predetermined secret password into the workstation, thereby initiating the operation of the workstation in the fallback mode of operation.

BRIEF DESCRIPTION OF THE DRAWINGS

These and other aspects of the invention will become more apparent from the following detailed description of the invention taken in conjunction with the drawings, wherein:

FIG. 3 shows the format of a typical client account code; and

FIGS. 4-21 show various display screen menus which may be displayed to an operator during the operation of the MMS.

DETAILED DESCRIPTION OF THE INVENTION

Figure 1:
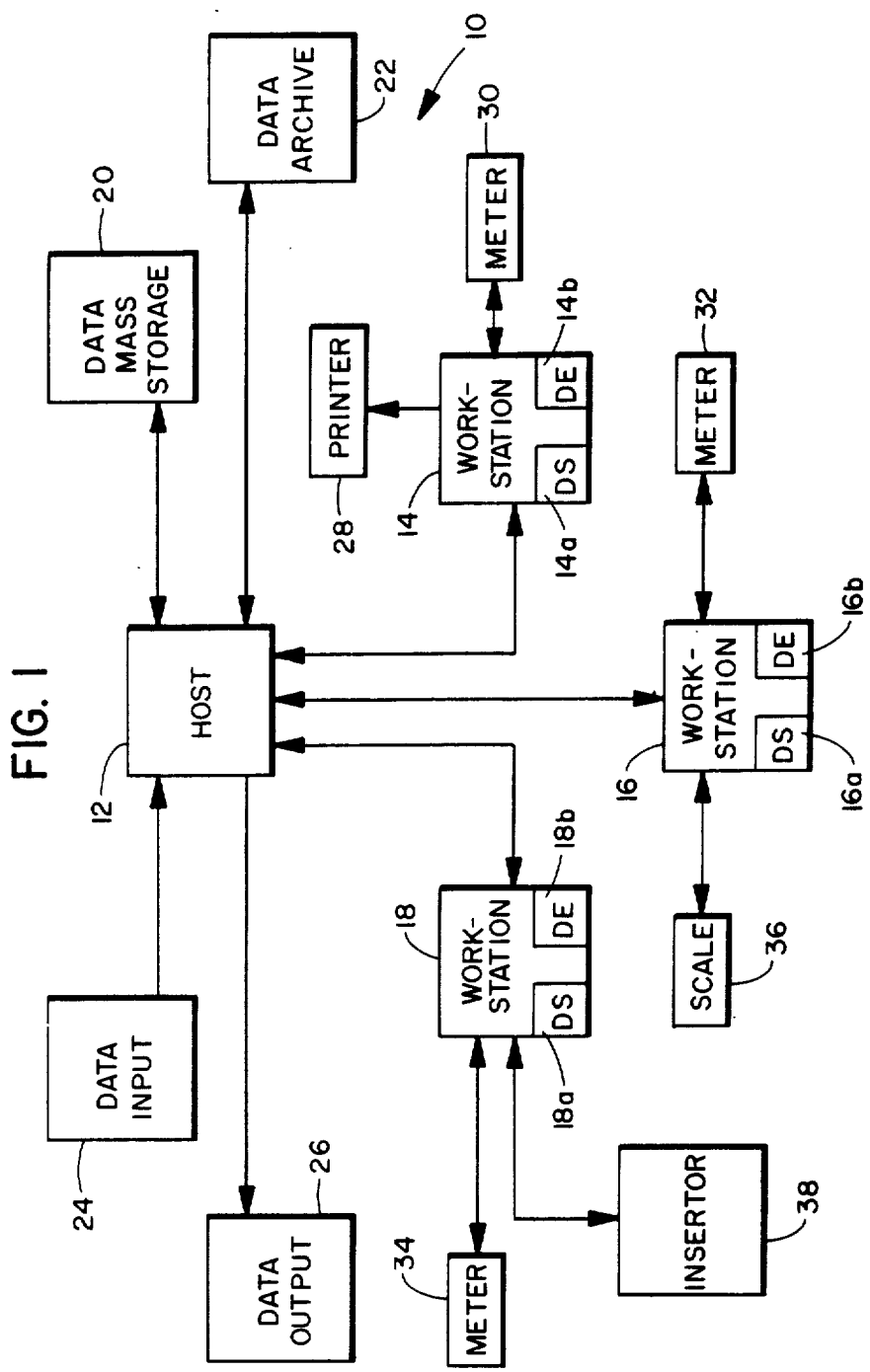
FIG. 1 is a block diagram showing a mailroom management system in accordance with the invention.

Referring first to FIG. 1 there is shown in block diagram form a mailroom management system (MMS) 10 emodying the principles of the invention. MMS 10 may be seen to be comprised of a host 12 which is bidirectionally coupled to a plurality of mail data stations (MDS), such as operator workstations 14, 16 and 18. Although three such workstations are shown in FIG. 1 it should be realized that more or less than three may be coupled to the host 12. For example, from one to some large number of workstations, for example 16, may be so coupled to the host 12. The manner of coupling between host 12 and a particular workstation, such as the workstation 14, may be by any of a variety of well known data communication coupling means. Such means may include bit serial data communication means such as RS-422 or RS-232. The connection may also be by a parallel data coupling means. The connection may also be made via telephonic modem or by any of a number of similar long distance data communication means. Thus, it can be seen that an individual workstation may be physically located proximate to the host 12 or may be physically located at a great distance from the host 12.

Host 12 may be a microcomputer, a minicomputer, a personal computer or even a main frame type computer. In general, the host 12 has the characteristics of a data processing system which is operable for communicating with individual ones of the workstations 14 through 18, and for executing a variety of software programs such as programs suitable for the transmission and reception of data to and from the workstations, accounting programs suitable for accounting for postage transactions, and report generation programs operable for producing reports indicative of postage and other expenditures on an account by an account basis. Other reports generated by host 12 may be reports expressive of overall machine, operator and mailroom productivity, such as reports indicative of equipment usage, equipment downtime and operator efficiency. As can be appreciated, such programs may be software elements of a data base management system (DBMS), the data base being comprised of individual accounts and accounting data related to these accounts. Data, which typically comprises postage accounting data, may be stored within an internal memory of the host 12 and/or may be stored on a data mass storage means 20 such as a well known magnetic disk. The aforementioned software programs may also be stored on mass storage means 20. Host 12 may also have a data archiving and backup means 22, such as a tape storage device, for storing this postage accounting data. Also coupled to host 12 is typically an operator data entry means, such as a keyboard 24 whereby an operator may enter data and desired commands into the host 12. The host 12 may also have data output means which may comprise a well known display device 26 for displaying entered data to the operator. The data output means may also comprise a printer which is operable for printing reports of mail transaction related data under the control of the host 12.

Each of the operator workstations 14 through 18 may also comprise a microcomputer or a similar type of data processing system. Each of the workstations may also typically comprise an integral data entry (DE) device 14b, 16b, 18b, respectively, such as a keypad or a typewriter type keyboard. Each of the workstations may also comprise a local data storage (DS) means 14a 16a, 18a, respectively, for the local storage of data including postage related data. Each of the workstations may also comprise an integral printer (not shown) for printing postage related data for viewing by an operator or, each may be coupled to an external printer 28 for printing such data. Each of the workstations may be communicatively coupled to a postage meter 30, 32 and 34, although in some systems there may be a plurality of workstations only some of which, or even only one of which is coupled to a postage meter. Each meter comprises a postage indicia generation means, such as a printer, and postage accounting registers. As has been previously described, these registers are typically an ascending and descending register which are incremented and decremented, respectively, by an amount equal to the amount of postage dispensed by the meter. The accounting registers may be contained within a non-volatile memory means within the meter, as is well known in the art. Each of the meters 30, 32 and 34 is operable to dispense postage when so commanded by the attached workstation 14, 16 and 18, respectively. In addition, each of the meters is operable for transmitting at least the current values of the ascending and descending registers to the attached workstation.

In addition, each workstation may have a mail piece weighing means such as a scale 36 attached thereto. Each of the workstations may also be coupled to an insertion machine, such as a highspeed insertion machine 38 which is operable for collating a plurality of mailpiece inserts, inserting this collation into an envelope and subsequently conveying the envelope to the meter 34 to have the correct value of postage applied thereto. Each of the workstations may also be coupled to a mailing machine.

One particular workstation which is particularly well suited for the above described functions is known as the A305 workstation which is manufactured by Pitney Bowes Incorporated of Stamford, Conn.

Figure 2:
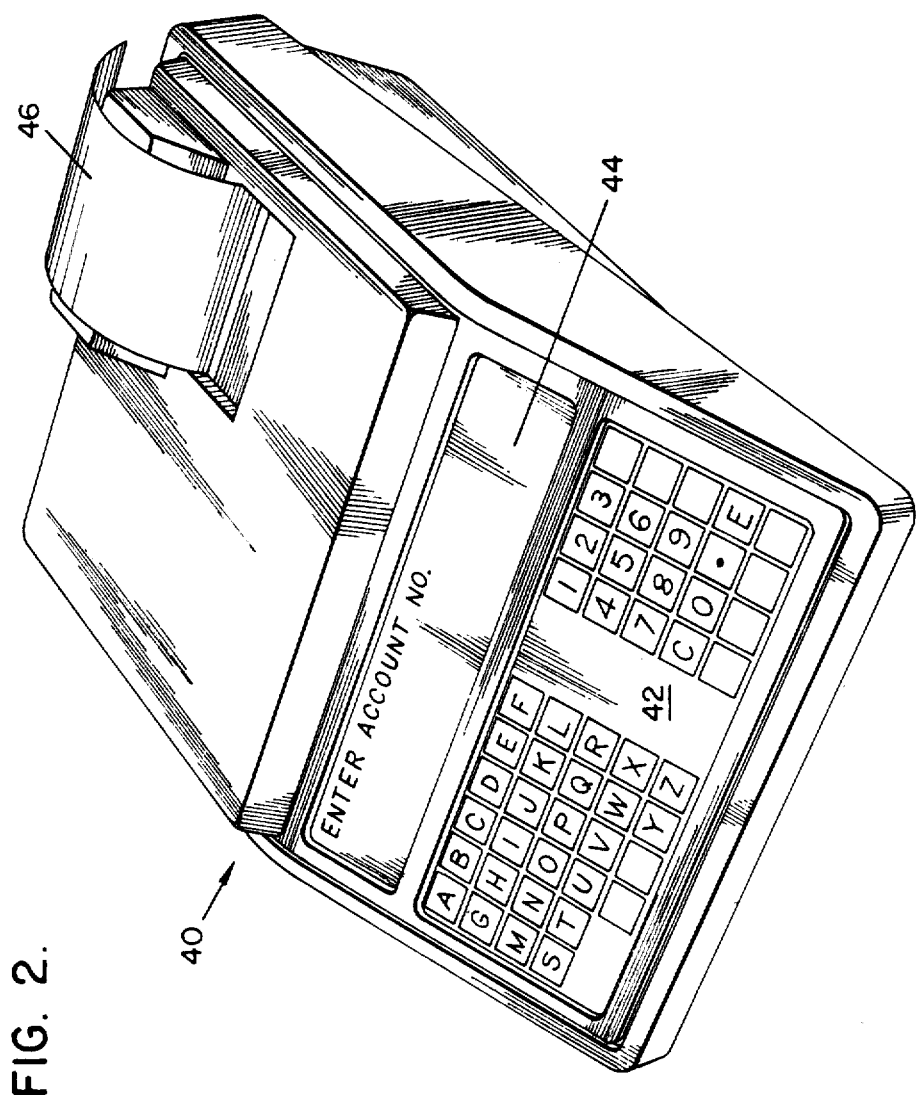
FIG. 2 shows a representative operator workstation useful with the system shown in FIG. 1.

Referring to FIG. 2 there is shown a representative view of a typical workstation 40 which is suitable for practicing the invention. It can be seen that the workstation 40 has an alphanumeric keyboard 42 for the entry of data and a display 44 for displaying the entered data and other information, such as prompts for information, to an operator. The workstation 40 also has a plurality of integral communications ports, not shown in FIG. 2, such as RS-422 ports, at least one of which is operable for bidirectional communication with the host 12. Other communication ports, such as ECHOPLEX ports, may be utilized for coupling the workstation to a scale, printer, meter and/or an inserter system. Workstation 40 may also have a printer 46 for printing data for viewing by the operator. The workstation 40 typically comprises an integral data processing means, such as a microprocessor device (not shown), and the requisite program and data memory (not shown) for executing software routines which are operable for providing a number of different functions related to the overall control of workstation 40. These functions may include the inputting of data from keyboard 42, the display and printing of data and the communication of data with host 12 and other devices coupled to the communications ports (not shown).

In general, the MMS system 10 operates as a distributed data entry system wherein data is entered at one or more workstations by an operator or operators. This data generally relates to the processing of mail within the mailroom. This entered data is collected and is stored by the host 12, typically, at the end of a mailing transaction. At desired, predetermined intervals this stored data may be formatted into a form which is suitable for the printing of reports. One type of report is a "posting" report which is a summary report of individual mailing transactions. These printed reports may contain data related to postage expenditures and other mail processing costs, the data being organized in an account-by-account type of format. Other reports may relate to operator or machine productivity and may be organized in an operator or a machine format.

Figures 3, 4:
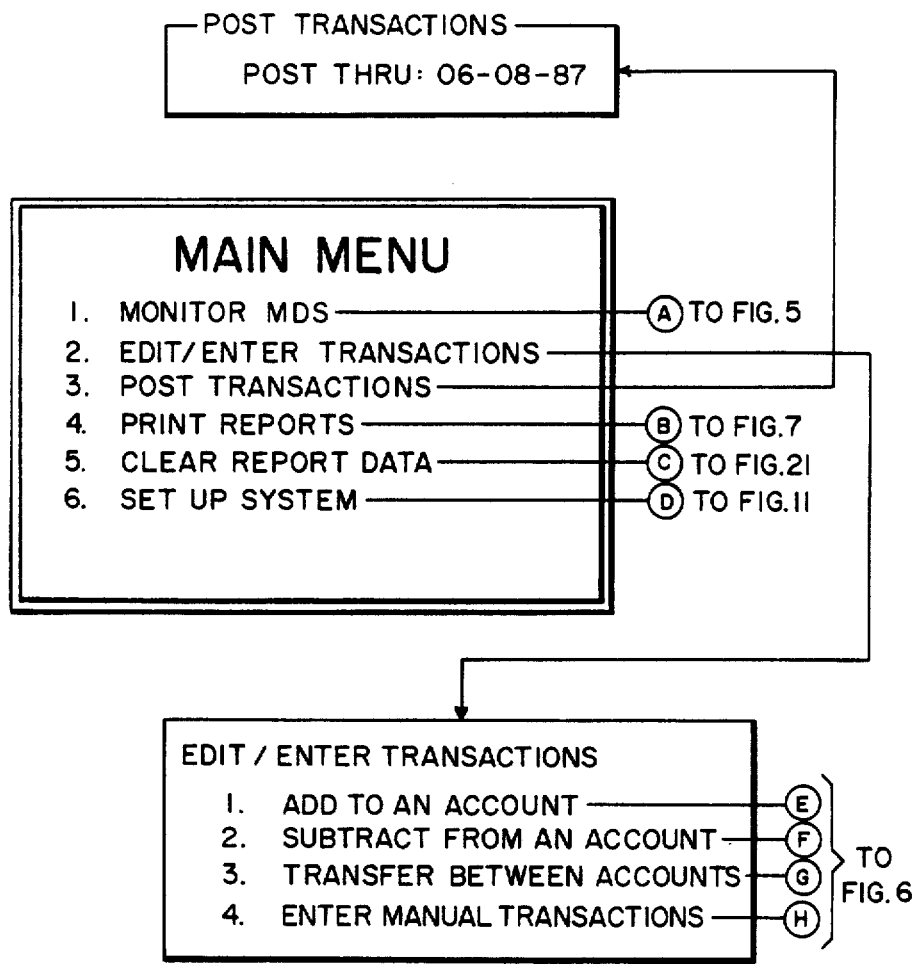
Figure 5:
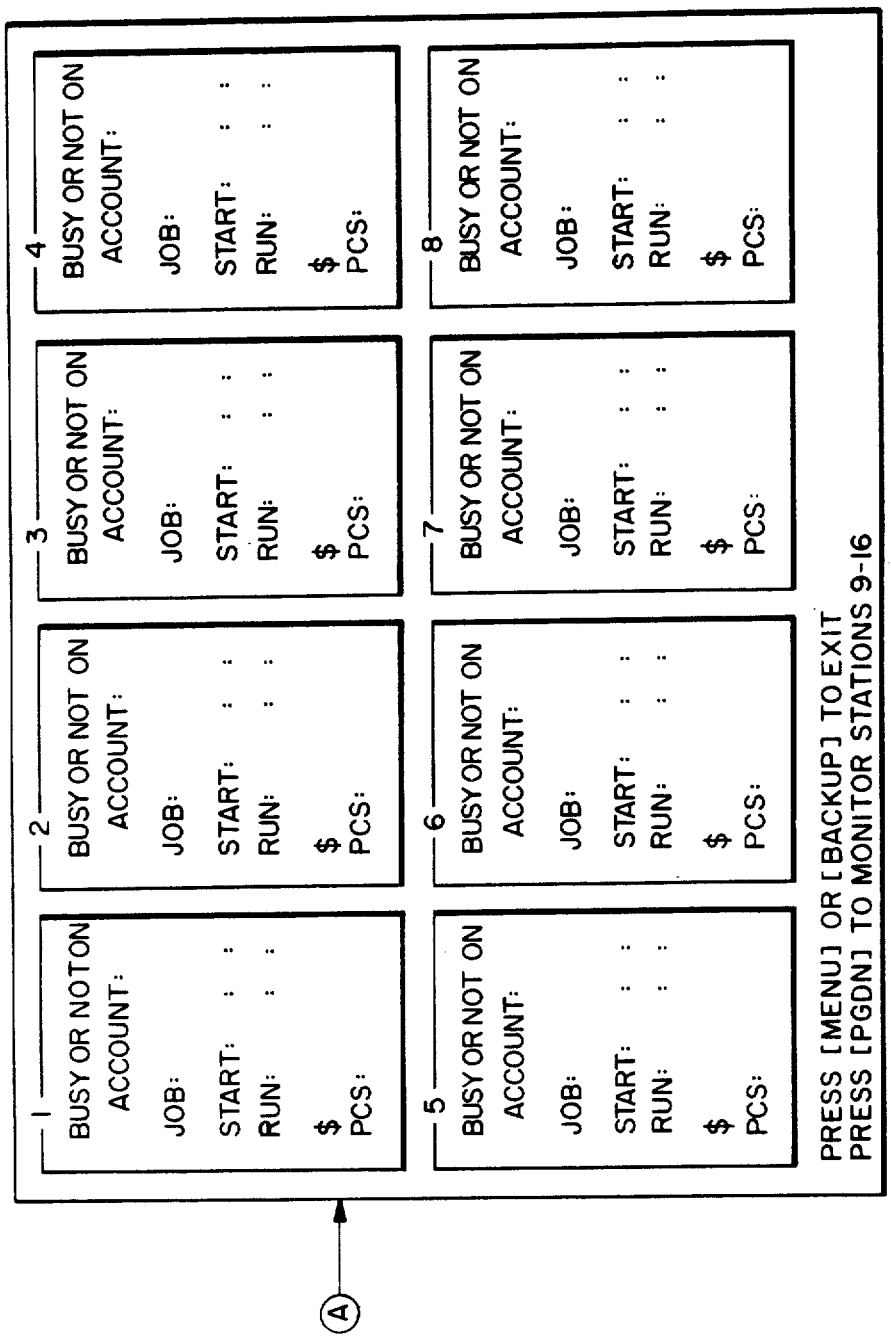

Referring now to FIGS. 4-21 there are shown a plurality of illustrative display screen menus which may be displayed to an operator of the system 10 during the operation of the system. Referring first to FIG. 4 there can be seen a Main Menu from which the operator may select one of a plurality of submenus. For example, if the Main Menu is displayed as shown in FIG. 4, the entry of the numeral 3 into keyboard 24 will result in the Post Transactions submenu being displayed to the operator. As can be seen, the Post Transactions submenu may prompt the operator to enter a date, the date relating to an interval of time for which the posting data is desired.

Figure 7:
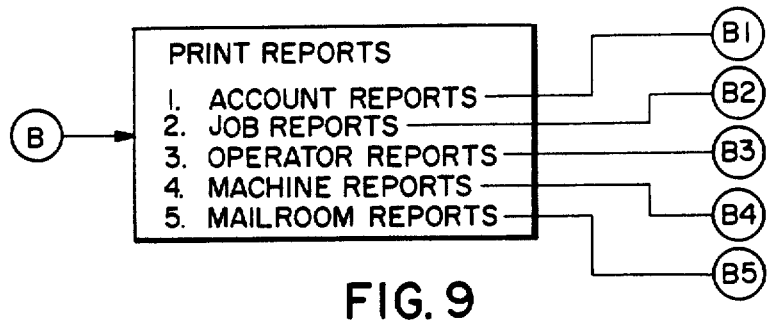
Figure 9:
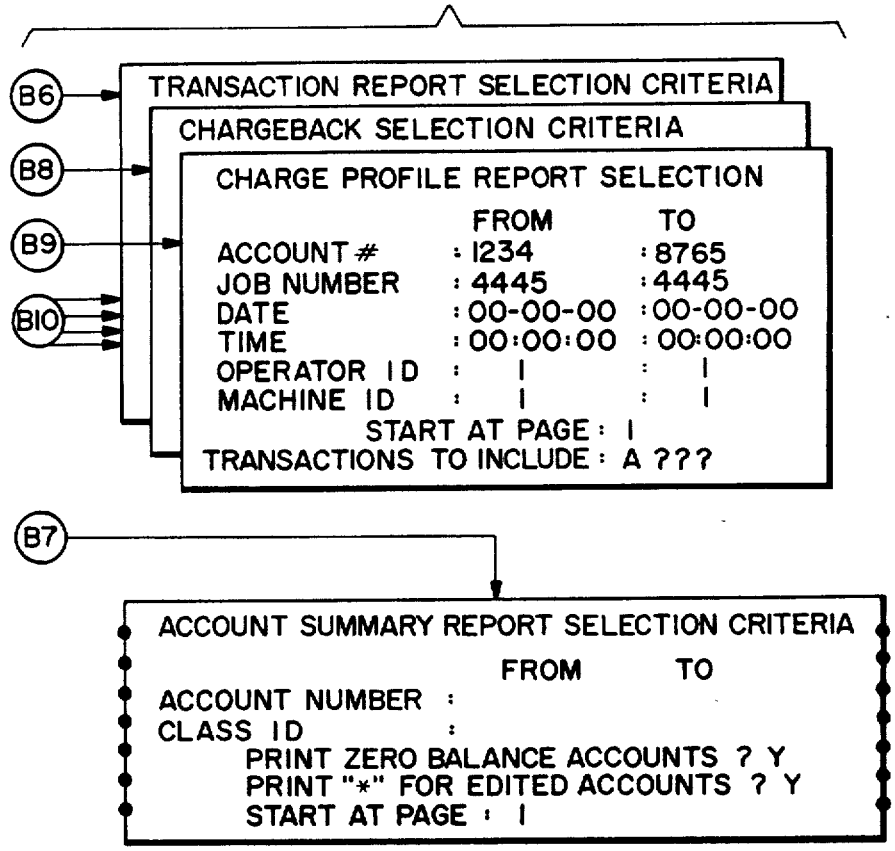
Figure 8:
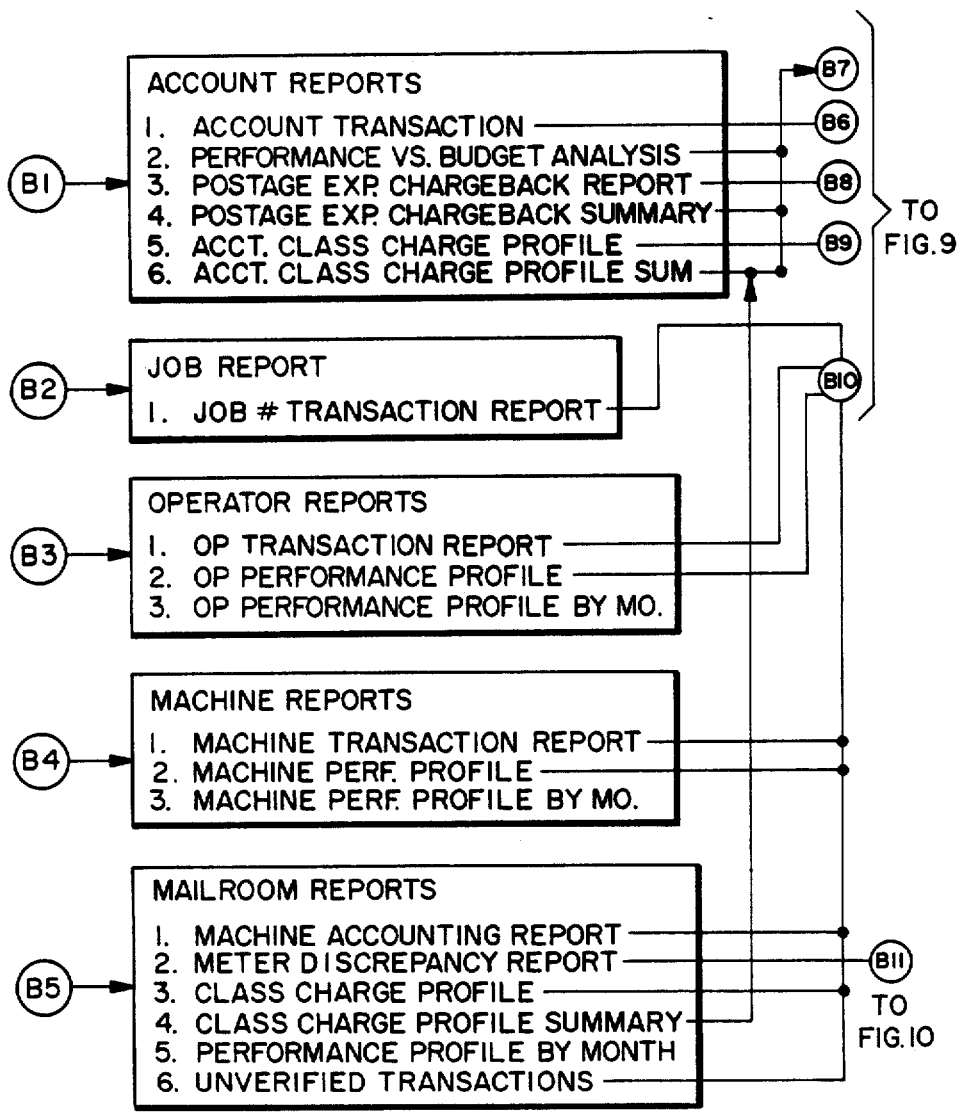
Figure 11:
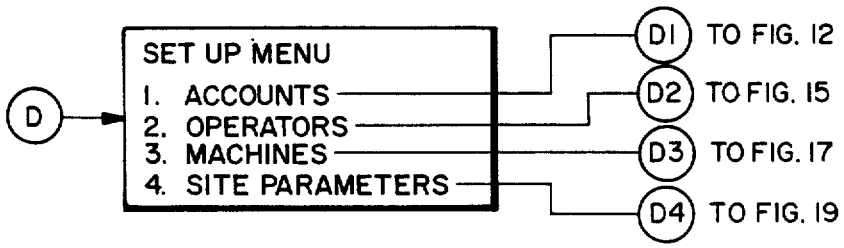
Figure 10:
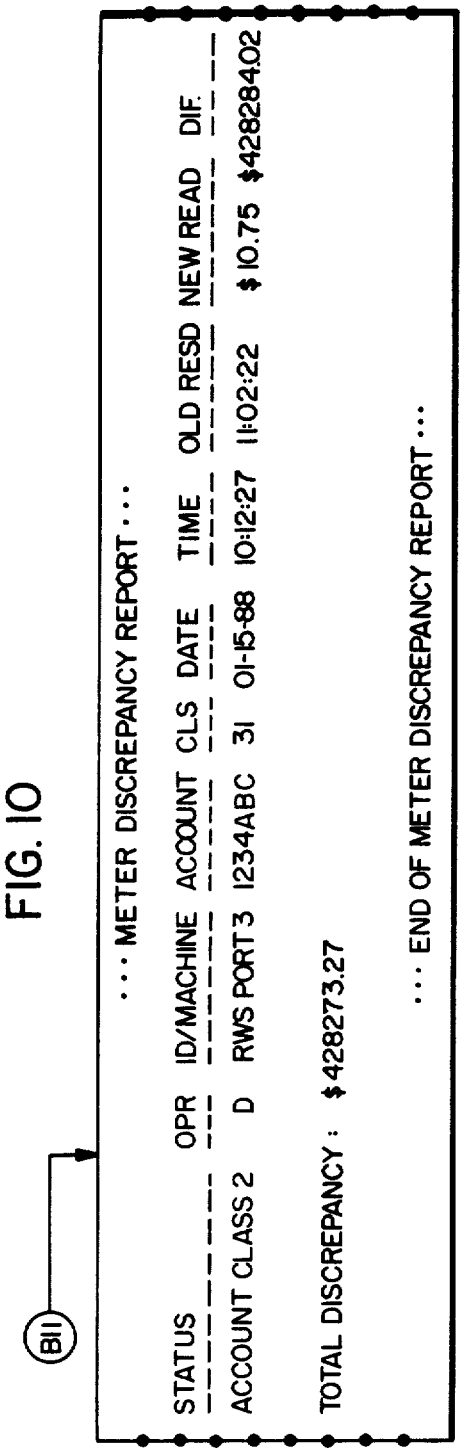
Figure 12:
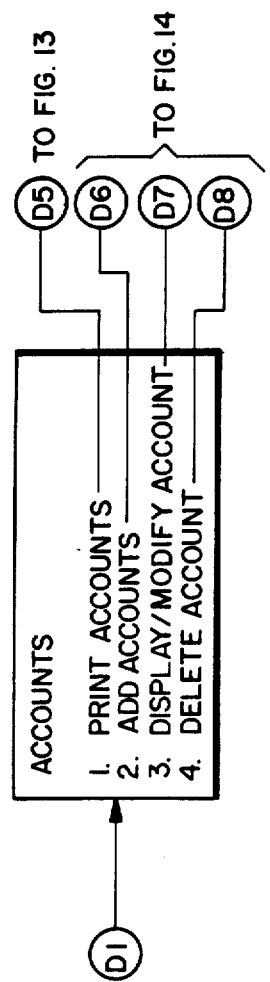
Figure 15:
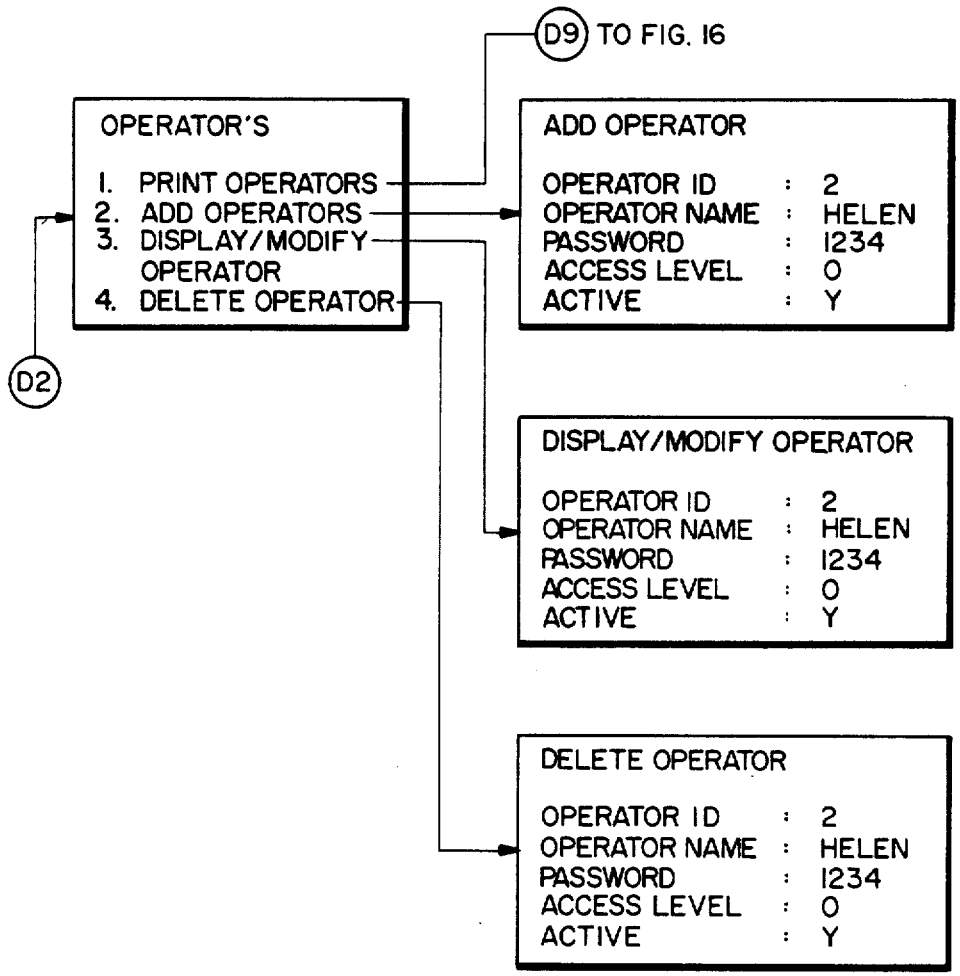
Figure 19:
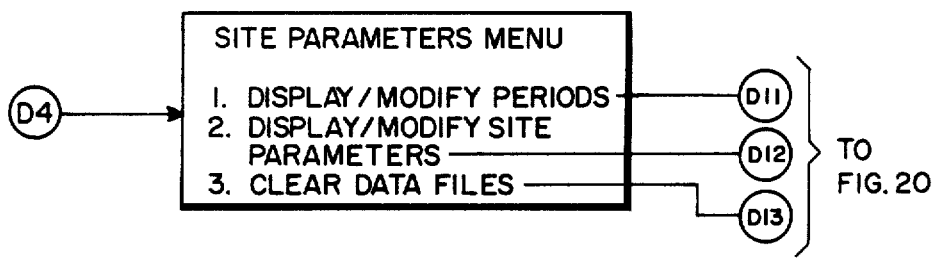
Figure 21:
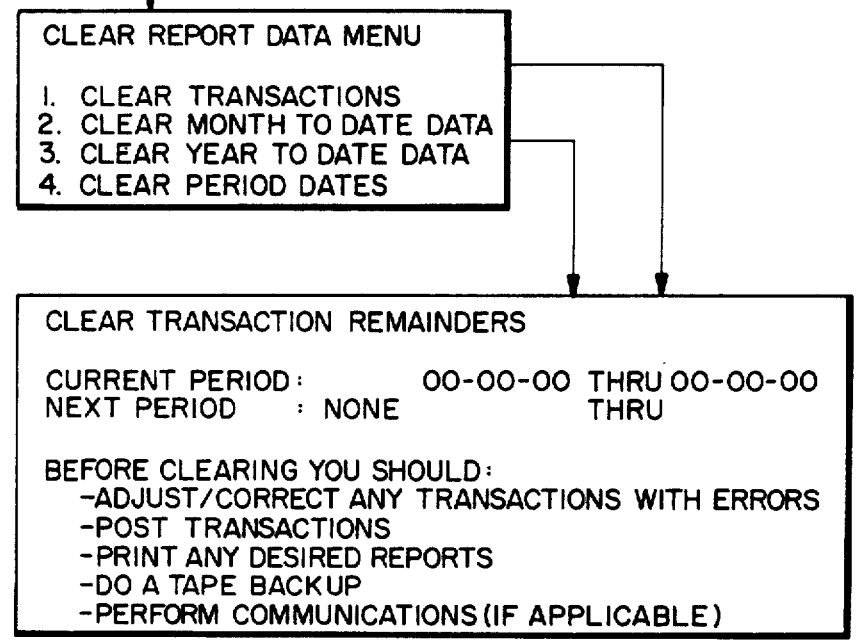

If the operator were to enter the numeral 4 when the Main Menu is displayed the Print Reports submenu would be selected and displayed to the operator, as shown in FIG. 7. As can be seen in FIG. 7, the Print Reports submenu comprises a number of different types of reports which may be printed by the system 10, such as Account Reports, Operator Reports and Mailroom Reports. If for example, the operator were to enter the numeral 1 when the Print Report's submenu is displayed, the Account Reports menu would be selected as shown in FIG. 8. In response to the displaying of the Account Report's submenu the operator may further select which type of Account Report is to be printed. The selection of a particular Account Report by the operator results in further submenus being displayed to the operator as shown in FIG. 9.

Thus, it can be realized that these various menus which are displayed by the host 12 to an operator facilitate the operation of the system 10 by the operator. It should be realized that the menus shown in FIGS. 4-21 are illustrative only and that more or less than the menus shown may be employed in a given system, the particular menu being employed possibly displaying other data or data having a different format than the particular menus shown in FIGS. 4-21.

In order to differentiate between the possibly large number of accounts which are maintained by the host 12, each account is typically assigned a unique account identification code, or account code. In order to express the account code, the host 12 may have a predetermined maximum number of data bytes allocated for expressing the account code. For example, an account code may be defined to be a data field of up to 16 bytes in length. Of course, not all of the 16 bytes need be used in a given system.

Referring now to FIG. 3 there is shown one possible format for an account code. As can be seen, the account code 50 is comprised of ten alphanumeric characters, resulting in six of the maximum of 16 bytes in the account code data field being unused. Of course, it should be realized that the maximum number of bytes in the field my be more or less than 16, and that the actual number of alphanumeric characters which comprise the account code may be more or less than ten up to the maximum number of bytes within the data field. In accordance with the illustrative example of FIG. 3, the first byte 52 of the account code is defined to be an alphabetic character having a value from A-Z. The remaining nine characters 54 are numeric characters each of which has a value from zero to nine. The remaining six characters 56 of the data field are unused in this particular illustrative example. As can be appreciated, such an account code is capable of uniquely identifying a large number of individual accounts.

The aforedescribed format of the illustrative account code, that is, one alphabetic character followed by nine numeric characters, may be transmitted from the host 12 to each of the workstations of the MMS. The workstations are thereby enabled to verify that an account code entered by an operator agrees at least with this specified predetermined format of a valid account code. Of course, the format of the valid account code may also be permanently stored within each workstation within a suitable nonvolatile memory means. The actual value of an individual account code, such as the account code shown (A1234567890) in FIG. 3, may be stored within the host 12 for verification by the host. It should be realized that in some systems the format may be defined as all alphabetic characters, or all numeric characters, or any desired combination of alphabetic and numeric characters.

In accordance with one aspect of the invention, a mailroom operator enters at the keyboard 42 of the workstation 40 a client account code for a particular job. The operator may also enter a value indicative of a monetary value to be charged to that account, such as a required amount of postage for the job. The term "job" may be considered herein to be any function performed as a secondary identifier to an account. That is, one account may have a plurality of different jobs simultaneously active in a mailroom. An identifying job number enables the accounting and productivity reports to be differentiated for each job.

For example, one job may involve the mailing of one piece of mail or a large number of pieces. Another job may involve the performance of a mailing related service, such as the insertion of literature within an envelope, whereby the entered value may be indicative of the time spent by the operator in performing this service. Another type of job may encompass accounting for nonpostage related mailing expenses, such as the expenses incurred when a piece of mail is delivered by a courier service.

After the operator enters the account code the workstation verifies by a suitable data comparison means that the format of the account code entered agrees with the format for a valid account code, such as the account code 50 shown in FIG. 3. If the format of the entered account code does so agree, the workstation may then transmit to the host system 12 the entered account code. The host then verifies that the entered account code is associated with an active, valid account code. Typically, the host 12 will have a data base of valid account codes which the entered account code is compared against. If the account code is found to be valid the account code may be considered to be verified. The host may thereafter transmit a postage dispensing enabling signal to the workstation. The workstation, upon receipt of the enabling signal, may then activate an attached postage meter to dispense the requested amount of postage. After dispensing postage, which may involve dispensing postage for a plurality of mailpieces, the workstation thereafter transmits data to the host, the data being transaction data expressive of the total amount of postage dispensed. The workstation may obtain this transaction data by interrogating the attached meter to determine the current value of the meter ascending register. The host then typically increments the expended postage value associated with the account code, thereby accounting for the postage dispensed by the meter during the preceding transaction.

If the account code entered by the operator into the workstation is found not to have a valid format, the workstation may notify the operator by means of display 44 that the format is invalid, thereby permitting the operator to reenter the number. If the host system determines that the entered account code is an invalid account code for any reason, such as if the account code has been designated as an inactive or "locked" account, the host 12 may not transmit the enabling signal to the workstation, thereby prohibiting the workstation from activating the postage meter.

As has been stated, the individual accounts maintained by the host and/or the collected transaction data may at any time be provided in the form of a report. Based upon such a report, such as a posting report, a supervisor of the mailroom is enabled to determine the amount of postage expended and the cost of postage related services allocated to each account, thereby permitting each account to be correctly invoiced for this amount.

In accordance with the invention, if for any reason the host system is unable to communicate with a particular workstation, the workstation may still activate the postage meter based upon the workstation verifying that an entered account code has a valid format. In so doing, the workstation will maintain a record within its memory of each entered account code having a valid format and the amount of dispensed postage or charges related to, for example, services associated therewith during the period that the workstation is unable to communicate with the host. At a time subsequent to the dispensing of this postage, and when the host is once more able to communicate with the workstation, the host may command the workstation to transmit at least these stored account codes and associated value amounts for verification by the host that the account codes are valid. If the account codes are found to be valid the respective account amounts will be updated to reflect the expenditures made during the time that the host system was unable to communicate with the workstation. If for any reason an account code is found to be not valid an exception file may be created by the host, the file containing those account numbers and the related expenditures which are for any reason found to be invalid. This exception file may then be outputted by the host for review by a mailroom operator, such as by the mailroom supervisor, in order that the supervisor may properly allocate, if possible, the expenditures to valid account codes. This mode of operation is referred to herein as a fallback mode of operation.

In order to initiate this fallback mode of operation of the workstation, the supervisor may be required to enter a predetermined secret code number into the workstation, the receipt of this predetermined code number notifying the workstation that the fallback mode of operation is in effect. Thus, only the supervisor or a limited number of mailroom operators may initiate this fallback mode of operation, thereby preventing the fraudulent or inadvertent dispensing of postage.

This fallback mode of operation overcomes the problems of the prior art wherein a postage dispensing system was disabled by the failure of a system component. In accordance with the invention, the mailroom may continue in operation even if the host 12 is unable to communicate with the workstations. This fallback mode of operation may also be advantageously employed in those situations wherein it may not be desirable to maintain a constant, real-time communication link between the host and a workstation. For example, if the host and the workstation are coupled together by a long distance telephonic modem connection, it may be economically desirable to place the workstation in the fallback mode of operation during most of its operational period, the long distance telephone link being established only at desired intervals in order to transmit to the host the records of account codes and the charges associated therewith.

As can be appreciated, a number of variations of the apparatus and method of the invention disclosed herein may occur to those skilled in the art. For example, although the invention has been described in the context of a postage dispensing system, the invention may also be advantageously employed in a variety of value printing systems wherein the values printed are associated with one or more unique accounts. Such value printing systems may be systems that print tickets for entertainment events or systems that print lottery tickets. Also, the invention may be advantageously employed in other than value printing systems, such as in systems that account for office equipment usage. In such a system, a workstation may be coupled to a document copier, so that the usage of the copier can be accurately accounted for. For example, in order to initiate a copying session to generate copies of a document an operator may enter an account code to which the cost of the copies is to be charged. This data may then be collected by the host at the end of the copying session for subsequent incorporation into a report which summarizes the total copier-related costs for the account over a given period of time. Thus, the invention is not to be considered to be limited by the embodiments disclosed herein, the invention is instead intended to be limited only as defined by the appended claims.

What is claimed is:

1. An accounting system comprising:
   one or more operator workstations, each of said workstations having data entry means for entering and data memory means for storing accounting related data, the data being representative of at least an account identification code and a monetary value that is required to be charged to said account identification code;
   a separate host device including data processing means;
   means for connecting by way of a communications link said host device to each of said workstations;
   each of said workstations including means for transmitting to said host device the accounting related data;
   said host device including means operable upon receiving from one of said workstations the accounting related data for validating the received account identification code and also means for transmitting back to said one workstation a value dispensing enabling signal when the received accounting related data is valid;
   a postage dispensing device connected to at least one of said workstations, said workstation including means to activate said postage dispensing device to dispense a monetary value of postage upon receipt by the workstation of said value dispensing enabling signal.

2. The accounting system as defined in claim 1 wherein said host device further includes
   means for storing, for each account identification code, a record of the values dispensed relative to each account code;
   means for incrementing said record of values by an amount related to dispensed postage; and
   means for generating a report from the stored records, the report being representative of at least the value of postage dispensed relative to a given account identification code.

3. The accounting system as defined in claim 1 wherein the number of workstations is greater than one, and
   each of said workstations further includes means for storing data representative of a predetermined format of a valid account identification code.

4. The accounting system as defined in claim 3 wherein
   each of said workstations includes data comparison means for determining that a format of an entered account identification code has a format that is in agreement with said predetermined format.

5. The accounting system as defined in claim 3 wherein each of said workstations further includes means for receiving a command to initiate a fallback mode of operation such that the workstation is enabled to activate said postage dispensing device to dispense postage when the workstation determines that the format of an entered account identification code is in agreement with the predetermined format.

6. A postage dispensing system as defined in claim 5 wherein each of said workstations further comprises means for storing within said data memory means fallback mode transaction data, said transaction data being representative of at least an account code and an associated monetary value which is dispensed after the initiation of the fallback mode of operation, each of said workstations further comprising means for communicating said stored transaction data to said host device at a time subsequent to the dispensing of the value.

7. A method of accounting for dispensed value comprising the steps of:
   providing one or more operator workstations each of which is operable for having data entered and stored within;
   connecting at least one of the workstations to a postage dispensing device such that the workstation is enabled to activate the device to dispense a value of postage;
   connecting each of the workstations to a host data processing device such that each workstation is enabled to bidirectionally communicate data with the host;
   entering data at a workstation, the data being representative of an account identification code;
   transmitting the entered data from the workstation to the host;
   verifying, at the host, that the entered data is representative of a valid account identification code;

transmitting, when the account identification code is verified, a value dispensing enabling signal from the host back to the workstation; and activating the postage dispensing device to dispense a value of postage upon receiving the dispensing enabling signal.

8. The method of claim 7 wherein the step of entering data further comprises a step of:

verifying at the workstation that a format of the entered account identification code is in agreement with a predetermined format.

9. The method of claim 7 further comprising a step of:

incrementing a value related to the account code by an amount related to the value of postage dispensed.

10. The method of claim 9 further comprising a step of:

entering a command at a workstation, the command being a command to initiate within the workstation a fallback mode of operation whereby the step of activating the postage dispensing device is accomplished prior to the step of verifying, at the host, the account identification code.

11. A method of accounting for dispensed value comprising the steps of:

providing a plurality of operator workstations each of which is operable for having data entered and stored within;

connecting said workstations to a postage dispensing device such that each workstation is enabled to activate the device to dispense a value of postage;

storing data within a workstation, the data being representative of a format of a account identification code;

entering the data within a workstation, the data being representative of an account identification code and the value of postage;

verifying, at the workstation, that the entered data has a format equal to the stored format for the account identification code; and connecting each of the workstations to a host data processing device such that each workstation is enabled to bidirectionally communicate data with the host;

when the format of the entered data is verified transmitting the stored data representative of the account identification code and the value of postage from the workstation to the host;

verifying, at the host, that the account identification code is representative of a valid account identification code;

when the account identification code is verified at the host, transmitting back to the workstation a postage dispensing enabling signal;

upon receipt of the postage dispensing enabling signal, activating the postage dispensing device to dispense a value of postage.

12. The method of claim 11 wherein the step of activating further comprises a step of:

storing data representative of the account identification code and the value of postage.

13. The method of claim 11 wherein, when the account identification code is verified, incrementing, at the host, a value related to the account by an amount related to the value of the postage.

14. The method of claim 11 wherein, upon the workstation being unable to communicate with the host, entering a code in the workstation to initiate a fallback mode of operation wherein, after verifying at the workstation the format of the entered account identification code, the workstation activates the postage dispensing device.

* * * * *